United States Patent [19]

Hill

[11] 4,180,990

[45] Jan. 1, 1980

[54] BI-DIRECTIONAL OVERRIDE COUPLING

[75] Inventor: Terence A. Hill, Bromley, England

[73] Assignee: Burroughs Corporation, Detroit, Mich.

[21] Appl. No.: 932,923

[22] Filed: Aug. 11, 1978

[51] Int. Cl.² ............................................. F16D 7/02
[52] U.S. Cl. ................................ 64/30 R; 64/30 D; 64/30 E; 64/30 A; 64/6
[58] Field of Search ............... 64/30 R, 30 C, 30 D, 64/30 E, 30 A, 29, 27 F, 6; 192/55, 56

[56] References Cited

U.S. PATENT DOCUMENTS

| 1,092,574 | 4/1914 | Jansson | 64/29 |
| 1,498,171 | 6/1924 | Kaps | 64/29 |
| 2,083,842 | 6/1937 | Henning | 64/30 E |
| 2,164,485 | 7/1939 | Yanti | 64/30 D |
| 2,461,447 | 2/1949 | Siesel | 64/29 |
| 2,501,648 | 3/1950 | Ogden | 64/29 |
| 2,751,767 | 6/1956 | Hedden | 64/30 A |
| 3,834,183 | 11/1974 | Muller | 64/30 E |
| 3,932,956 | 1/1976 | Young | 64/30 D |
| 4,006,787 | 2/1977 | Rumpp | 64/30 D |

Primary Examiner—Charles J. Myhre
Assistant Examiner—R. C. Turner
Attorney, Agent, or Firm—John J. McCormack; Nathan Cass; Kevin R. Peterson

[57] ABSTRACT

A novel resilient torque-limiting coupling adapted to accommodate axial- and angular-shaft misalignment (e.g., between a driving shaft and a driven shaft), as well as offering a torque-limiting capability in a very simple construction.

15 Claims, 7 Drawing Figures

4,180,990

BI-DIRECTIONAL OVERRIDE COUPLING

BACKGROUND, FEATURES OF INVENTION

This invention relates to motion transmitting means and particularly to "misalignment couplings" capable of transmitting power between a pair of shafts, despite their relative misalignment, to "override-couplings" ("slip-couplings"), offering a torque-limiting capability.

Workers familiar with the art of making and using various coupling devices are aware that certain "misalignment couplings" have been proposed which are adapted to transmit force (motion) applied along a driving shaft to a relatively misaligned driven shaft (i.e., which may be misaligned either angularly and/or axially with respect to the driving shaft).

One common example is the well known "Oldham coupling" (accommodating axial misalignment); another is the standard universal joint, allowing for angular misalignment. Various other "misalignment couplings" accommodate one or both types of misalignment, such as various flexible couplings—e.g., the "flexible disk" couplings, or the "resilient spider" coupling or the "double-wound-helical" coupling.

Workers are also aware that such "misalignment couplings" can be provided an "override" feature adapted to accommodate, and adjust to, excess applied torque. For instance, the "leaf spring/shaft flat" combination is such an arrangement, as is the "spring loaded ball" clutch and various frictional clutches (a salient example of which would be the so-called "slip-clutch", or torque-limiting indent clutch—such a coupling typically combining an Oldham coupling with a slip-clutch or like, adjustable friction clutch, friction plate, and adapted for limited shaft misalignment). The invention is adapted to provide an improved misalignment/override coupling—one affording great design freedom, with improved flexibility, with more consistent performance; one requiring little assembly time and no torque-adjustments (for moderate torque variations); and a coupling capable of being rendered in very simple, inexpensive, form using simple inexpensive manufacturing techniques.

BRIEF DESCRIPTION OF THE DRAWINGS

These and other features and advantages of the present invention will be better appreciated by workers as they become better understood through reference to the following detailed description of present preferred embodiments, these being considered in conjunction with the accompanying drawings, wherein like reference symbols denote like elements and wherein:

FIG. 5 is an enlarged schematic perspective end view of the male member of the embodiment in FIG. 2; while

DESCRIPTION OF PREFERRED EMBODIMENT

Figure 2:
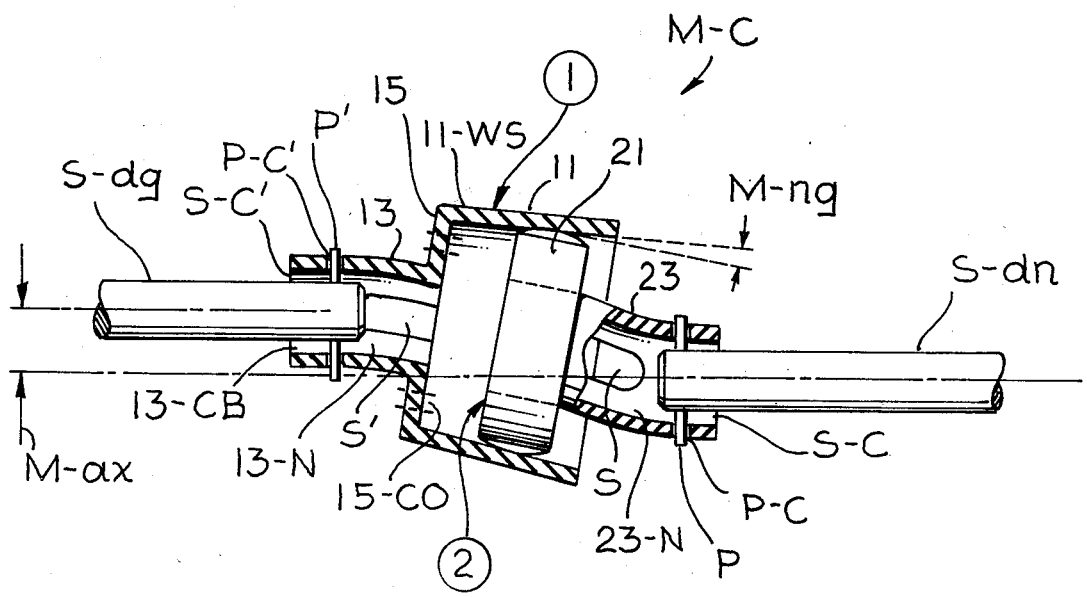
FIG. 2 is a side elevation, in partial section, of a preferred embodiment of the invention; the elements of this are shown in simplified, exploded-away fashion in FIG. 3; and shown in a simplified partial section in FIG. 4, indicating an exemplary extreme shaft misalignment.
Figure 3:
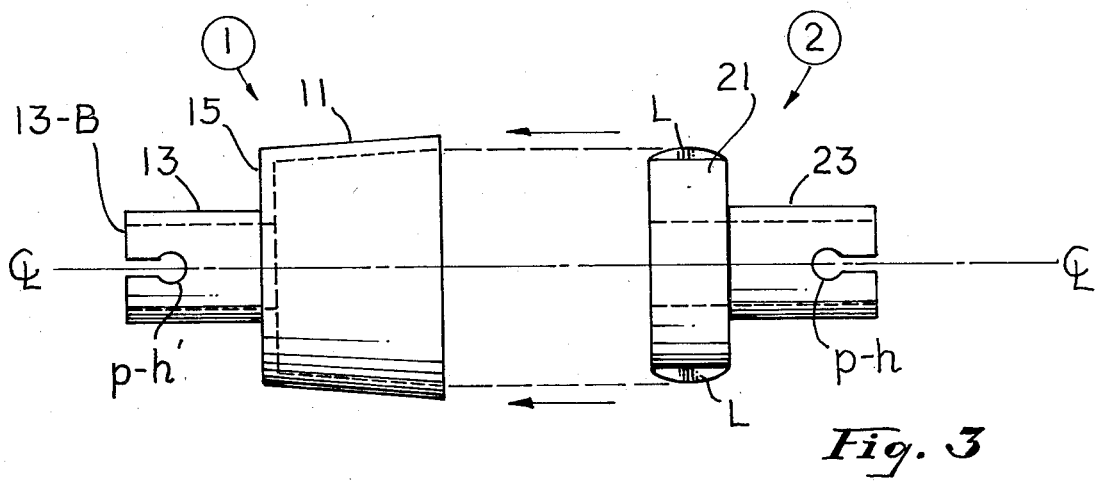

General, rathher functional description of embodiment; FIGS. 2, 3

A preferred embodiment of the invention is shown in FIG. 2, with related views in FIGS. 3-7. This embodiment provides a relatively simple "misalignment/override coupling" M-C between a prescribed driving shaft, S-dg, and a corresponding driven shaft, S-dn—one adapted to accommodate prescribed degrees of shaft-misalignment, torsion and shaft-skew. That is, coupling M-C will be seen as accommodating angular and axial misalignment between shafts as well as providing a torque-limiting (override) capability, further discussed below. Coupling M-C is preferably fashioned as an inexpensive molded two-part combination; that is, members 1 and 2 preferably comprising a pair of injection-molded, semi-rigid (flexible) plastic parts that interfit in "male-female" fashion in a prescribed "interference fit", as detailed below.

Coupling M-C generally comprises a relatively concave, female member 1 (a "flexible cup") and an associated, relatively hollow, lobed male member 2 (a "lobed head"). Member 2 is configured and adapted to be received within member 1 and provide the indicated "interference-fit" and function as an inter-shaft coupling with the mentioned advantageous functions.

Details of this embodiment are discussed below relative to FIGS. 4-6; however, more particularly, it will be perceived that female member 1 comprises a hollow cup-shaped cone 11 with a projecting flexible sleeve 13. The inner walls 11-ws of cone 11 describe a "conic frustum" adapted to mate, in frictional interference, with the cylindrical lobed periphery of lobed head or, knob, 2. Cup 11 is closed at its "distal" end (remote from its knob-receiving end) by a cap 15, on which sits the integral projecting resilient sleeve, or boss 13. Sleeve 13 is adapted to be removably fastened to the end of a shaft (e.g., to driving shaft S-dg) by a pin P' which is driven through the shaft cross-section and is received in an opposed registering pinhole (preferably snap-fit therein, as indicated in FIG. 2, see P-C') or fastened in any other suitable fashion as workers in the art well understand.

As further described below, the neck 13-N of sleeve 13 is resilient and tapered, at least adjacent cup 11—the taper affording greater clearance to accommodate shaft misalignment and skew. A deformed flexure portion 13-N, of this sleeve, or boss, is adapted to provide the prescribed angular/torsional resilience as detailed below. Workers will recognize that such a "resilient boss" can be designed to accommodate various degrees of flexure and deformation and so accommodate different degrees of shaft misalignment.

Figure 5:
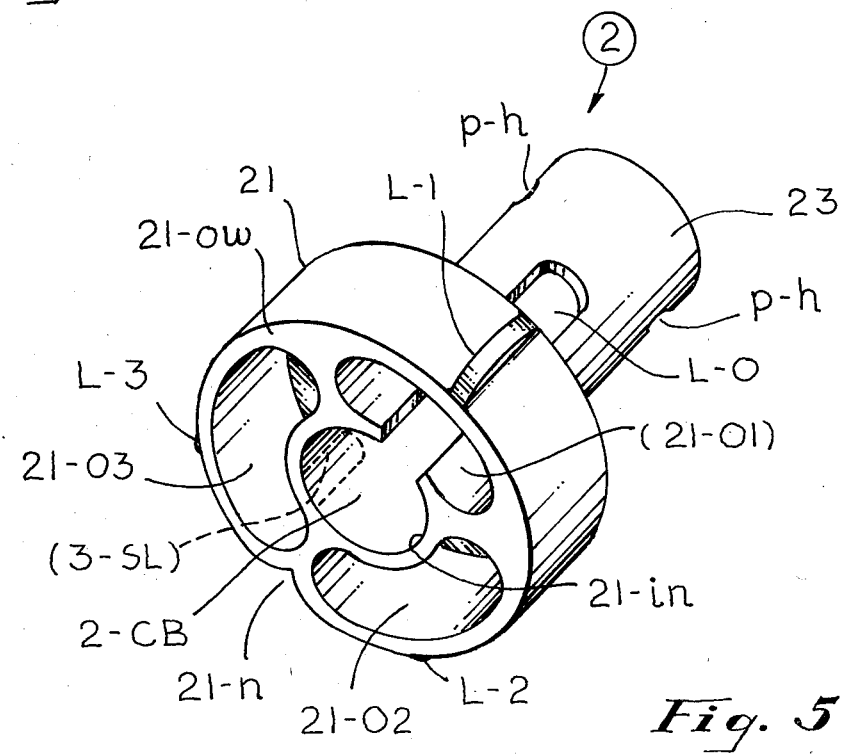
Figure 7:
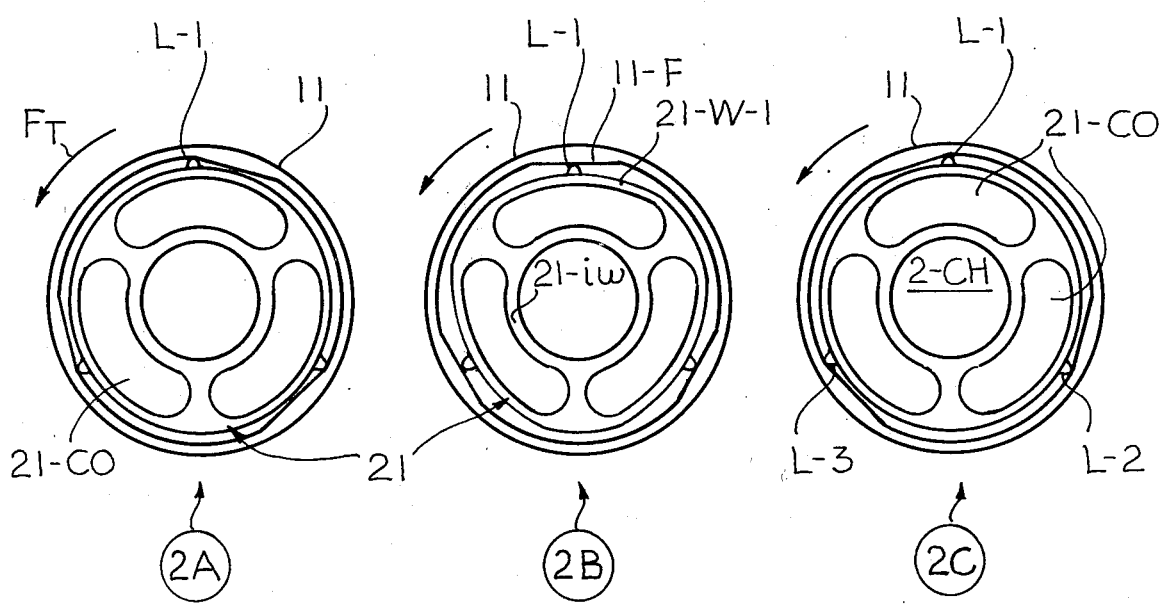
FIG. 7 is a simplified end view of the female member of this combination in three different operational configurations, as stressed and distorted by rotated-lobe portions of the male member (these lobe portions being shown in section and simplified).

Male member 2 in general takes the form of a cross-sectionally-resilient, somewhat cylindrical head, or knob, 21 with a relatively spherical wall (see 21-ow, FIG. 5). About the exterior of wall 21-ow are a prescribed number of lobes (e.g., as seen in FIG. 7, described below) adapted to interfit in a prescribed manner—according to a principle feature hereof—with the inwardly-tapered inner walls 11-W of cup 11.

"Lobed-head" 21 is affixed on a relatively cylindrical, flexible sleeve 23 which is functionally similar to sleeve 13, mentioned above, and adapted to be fastened on the end of a shaft adapted to be coupled to the shaft on cup 11 (e.g., here see driven shaft S-dn as indicated attached by linking pin P). As in the case of sleeve 13, the proximate, neck portion 23-N of sleeve 23 is formed (e.g., materials used, inner cut-outs provided, etc.) to exhibit a prescribed resilience so as to better accommodate a prescribed distortion and angular misalignment between the shafts. Sleeves 13, 23 are slotted (at S, S' respectively) as necessary to reduce stiffness and improve sleeve resilience and accommodation of the contemplated extreme deformation.

The distal end of shaft S-dg (beyond pin P-C') will be understood as foreshortened and/or beveled to prevent interference with sleeve 13 during extreme shaft misalignment.

Figure 1:
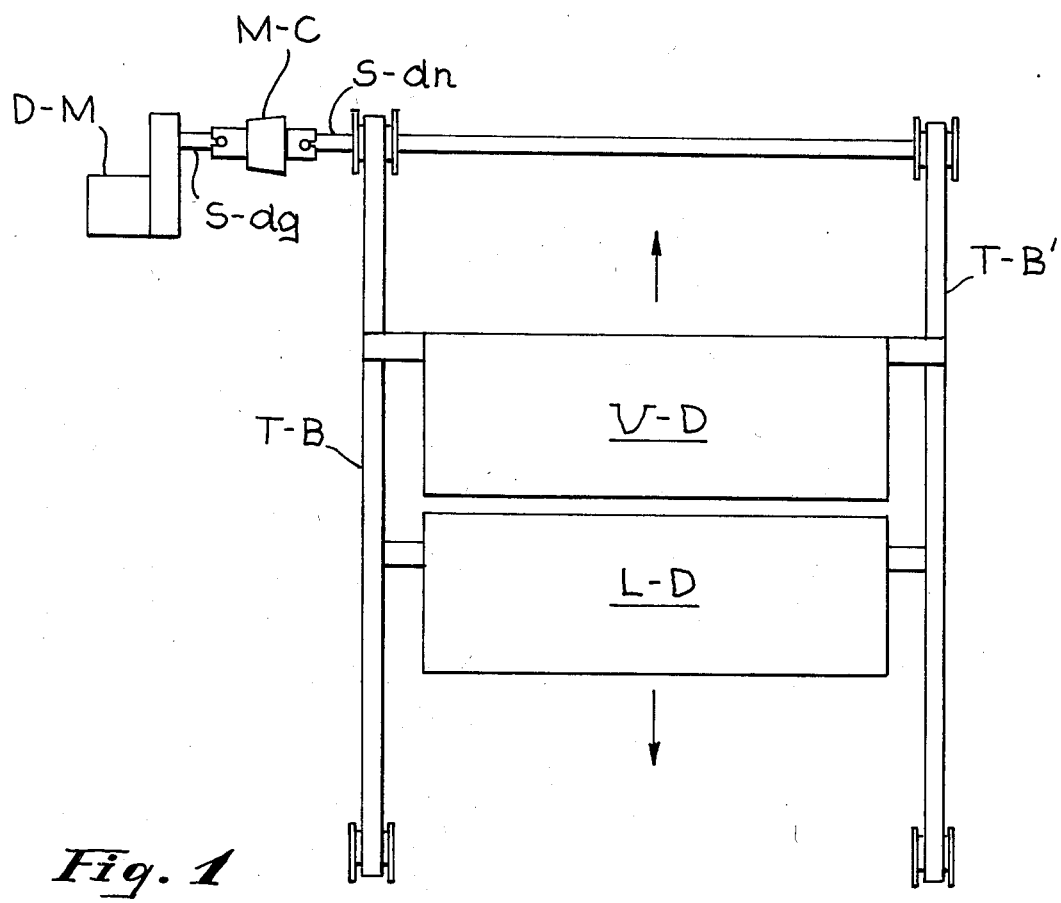
FIG. 1 is a very schematic elevation of a vandal door mechanism adapted to advantageously employ the present invention.

Typical application; FIG. 1

Workers will understand how a "misalignment/override" coupling M-C according to the invention may be applied usefully and advantageously. A preferred sort of application is indicated in FIG. 1, indicating the application of such a coupling M-C as part of the driving linkage adapted to open a pair of upper and lower doors, or "vandal gates", U-D, L-D, respectively, in a security arrangement for an apparatus such as a "Remote Teller".

Workers will understand that such a Remote Teller may, for instance, be used to dispense cash upon insertion of a proper credit card and other appropriate and encoded access signals (e.g., punched-in on an associated keyboard by a customer). On a proper signal from the teller-control mechanism—activating the processing of a given inquiry by a customer—the "vandal gates" U-D, L-D will be parted to expose a cash dispensing mechanism, keyboard units and the like. To effect this, the doors, suspended between a pair of toothed-belt linkages T-B, T-B', will be understood as parted by translation of this linkage, this activated, in turn by rotation of associated gear sprockets coupled thereto. These sprockets will be understood as driven in conventional fashion by a common driven-shaft S-dn, coupled to an associated drive motor D-M and driving-shaft S-dg via novel coupling M-C, fashioned according to the invention.

Thus, upon the appropriate signal, drive motor D-M will be activated, and the shafts and linkage move to part the doors, opening them to the limit of their travel, whereupon a switch will be automatically actuated, de-energizing the drive motor. The doors will remain open until the customer transaction is complete, whereupon the drive motor may be again activated (in the reverse direction) to close the doors in the same manner, the motor being de-energized, as before, by actuation of an associated limit switch. Such an arrangement and the operation thereof, will be understood as known in the art and implemented in a conventional way with known elements.

Workers will appreciate that there are several reasons for desiring a misalignment/override coupling like embodiment M-C in such a drive train. Such a coupling can eliminate a safety hazard to customers, preventing one's hand from being trapped and possibly injured by pressure on the closing doors (the torsional override feature of coupling M-C can easily limit the thrust of the drive train below that which would injure a customer's hand, as well understood in the art). Such a coupling can also prevent damage to the door-motor linkage in the event of an attempted forcing of the doors (e.g., forced entry by vandals or forced-closure by a customer)—the motor gearing being protected from overload condition by coupling M-C.

Also, coupling M-C can accommodate misalignment between the driving and driven shafts S-dn, S-dg. It will also accommodate simple, convenient materials and methods of fabrication, as workers will recognize. Further, in the event of system malfunction (e.g., malfunction of a limit switch supposed to stop the drive motor and limit the opening- or closing- excursion of the doors), coupling M-C can eliminate continuous motor stall and associated overload. Of course, this application is only exemplary; workers will contemplate many other applications for using couplings taught according to the invention.

Exemplary application; FIG. 2

FIG. 2 will be understood as also indicating a prescribed exemplary axial misalignment between the shafts, namely axial misalignment M-ax [e.g., the order of 0.04 inches for typical construction], plus a prescribed "skew" or angular misalignment M-ng, (e.g., order of up to 10° of arc)—both being accommodated by this coupling embodiment according to the invention.

In addition, each shaft is preferably joined to its respective resilient sleeve, so that a prescribed clearance (S-C, S-C' respectively is afforded; e.g., by oversized ID of sleeve relative to shaft OD)—with a prescribed related clearance in the respective drive-pin holes also (see clearances P-C, P-C'). That is, clearance holes, P-C, P-C' for the drive pins P, P' respectively should exhibit a prescribed "clearance" to allow freedom of movement for the coupling on the shaft, as workers in the art will understand.

By so providing a "clearance-fit" between the (driving and driven) shafts and their respective sleeves, the mentioned axial misalignment M-ax is better accommodated as workers will understand. This capability can be enhanced by allowing each member of the molded coupling M-C to resiliently deform (as further described below) when axially flexed. Slots along the sleeves can easily be configured to provide sleeve-flexure arms which will deform in a prescribed manner and with sufficient compliance to accept a prescribed shaft skew—according to this related feature of invention.

Male member; FIG. 5

Knob member 2 is shown, somewhat enlarged and in more detail, in FIG. 5 and will be understood as comprised of a head molding having semi-spherical walls on which are disposed an array of sectorial pieces, or lobes L-1, L-2, L-3, disposed symmetrically and equidistant about the periphery thereof. The walls of head 21, and of its connecting sleeve 23-N, are relieved to provide a prescribed degree of flexibility according to a feature of invention. That is, the wall thickness behind each lobe L-1, L-2, L-3 is relieved (see 21-01, 21-02, 21-03) so as to render a thin flexible wall section 21-ow, adapted to provide a prescribed degree of flexibility (indicated functionally in FIG. 7 and described below in respect thereto). Thus, the wall 21-ow define the thickness of the hollow, relatively cylindrical tube 21 between a center-bore 2-CB and the tube periphery. According to this feature, this outer wall is relieved to provide prescribed flexibility accommodating angular and axial misalignment, etc.

As illustrated, head 21 is preferably provided with three drive-lobes L-1, L-2, L-3—though any convenient number may be used, as workers will understand. Lobes L each define a relatively spherical sector, affixed on the head periphery, and are adapted, as indicated herein, to engage the (flats on) inner walls 11-W of cup 11. The outer diameter of wall 21 is, of course, dimensioned to allow lobes L to protrude therebeyond sufficient to effect a frictional engagement therewith. That is, the outer periphery of lobes L defines a spherical radius matching the inside diameter of walls 11-W of cup 11 (flats thereon).

Head 21 is hollow with a center-bore 2-CB (defined by inner wall 21-lw) adapted to "register" with sleeve 23, (and/or is tapered radially-inward therefrom to provide the indicated "interference fit" with the associated shaft S-dn).

The cylindrical walls forming tube 21 are relieved as mentioned, to render a relatively thin inner support wall 21-lw of prescribed flexibility and strength (according to the desired "override capability", as indicated below with respect to FIG. 7, and as workers will understand). The mentioned cut-out sections 21-01, 21-02, 21-03 in outer wall 21-ow help provide this resilience, adjacent a lobe L. Here, three cut-outs 21-O are illustrated, each separated by lands of prescribed size and shape which join the outer wall 21-ow to the inner wall 21-lw. More such slots 21-O may be cut for increased wall flexibility and greater misalignment capability, if such is desired, as workers can perceive.

Any conventional method may be used to key (join) head 21 to its associated shaft (i.e., here, to driven shaft S-dn), such as a straight knurled shaft, or a flat omnishaft, or the locking pin illustrated in these figures, as workers will appreciate. The center bore 2-CB of knob 21 can be tapered, if desired, to effect a "tapered clearance-fit" on the associated shaft 3-dg, as indicated (similar fit may be used to engage sleeve 13 with its associated shaft S-gg, as workers in the art will understand).

Female member; FIG. 6

Figure 6:
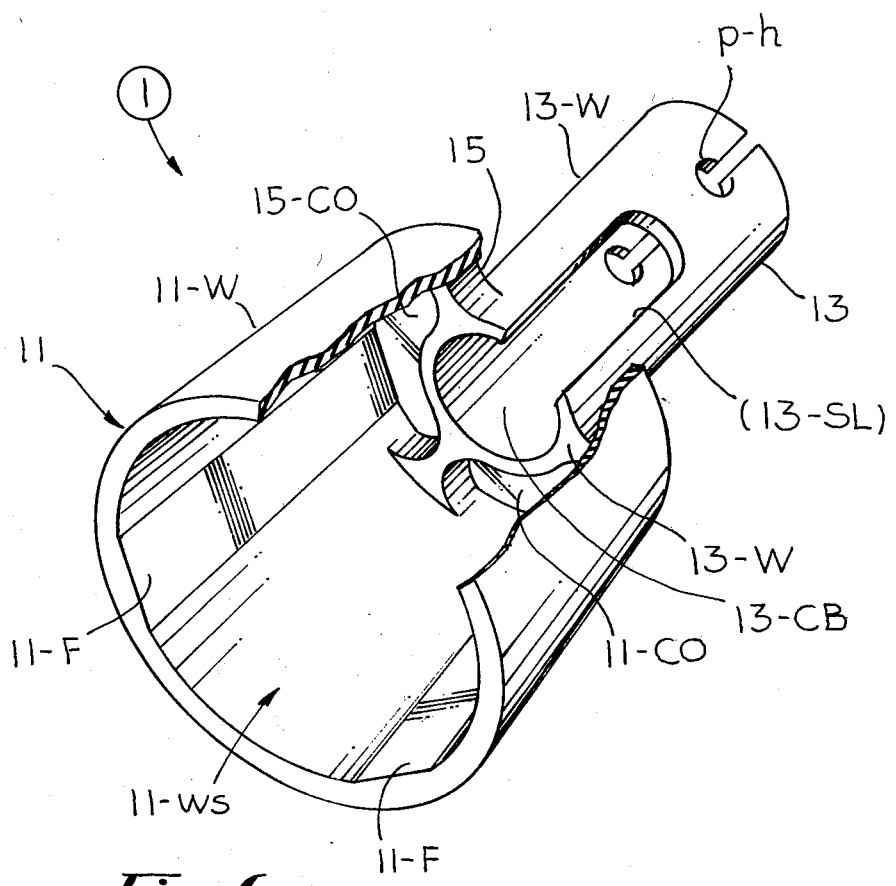
FIG. 6 is a similar view, partly cut-away, of the companion female member of this combination.

FIG. 6 shows the female member 1 of the subject coupling embodiment in FIGS. 2, 3, but somewhat enlarged and partly-sectioned. Cup 11 will be seen as basically comprising a frusto-conic (tapered cylindrical frustum) molding, the walls 11-W of which are given a prescribed flexibility according to their configuration and material. That is—according to a novel feature—cup 11 is so configured (e.g., walls relieved) and so fashioned (e.g., compliant plastic used) as to "tailor" the overall coupling's flexibility. A moldable plastic like a polyacetal (e.g., "poly Penco-Delrin") is preferred. A change in this (e.g., stiffer plastic and/or less wall-relief or less slotting of either member) will be understood as shifting characteristics (e.g., more stiffness and transmission of higher torque level—less shaft skew tolerated). A variation in the number of lobes used will do likewise—e.g., fewer lobes and/or narrower "flats" will provide a "softer" start (less torsional friction) and less operational heat (friction reduced—more slippage, less risk of heat softening material). For instance, using the mentioned poly-acetal in this embodiment has been found satisfactory up to about 30 rpm (ambient 70° F.).

The inside of walls 11-W is also provided with an array of interior cam-drive flats 11-F corresponding with the array of lobes on knob 2—i.e., each flat disposed and adapted to engage a respective drive lobe L on knob 2 in a prescribed manner, as workers will understand. That is, flats 11-F correspond in number to lobes L; i.e., the number of flats is the same as the number of drive-lobes L, or a multiple thereof—appropriately spaced.

Flats 11-F extend a prescribed distance axially along the inner wall surface 11-WS and will be seen as arrayed symmetrically about the axial center of cup 11.

More particularly, these cam-drive flats 11-F will be understood as offering an "interference fit" when engaged with drive lobes L and will preferably be tapered, axially, to give a prescribed "torque adjustment" as further detailed below. The inner, relatively conical, chamber so formed by the flats and inner wall surface will be seen to function as a drive (concave engagement) surface having a diameter matching the OD across the apex of the drive lobes, as mentioned above. This drive chamber is preferably tapered inwardly as indicated (to a conic section)—although it may optionally be made non-tapering for a particular application. That is, when a non-tapered chamber should give relatively constant torque-transmission, such a taper provides a way of modifying torque transmission, according to the depth of lobe penetration.

Cup 11 terminates in a cap 15 which is joined to a projecting resilient sleeve 13 as indicated above. Sleeve 13 has a relatively flexible neck portion 13-N as mentioned, with its proximate end joined to cap 15 in a relatively flexible joint. Accordingly, as an optional feature hereof, cap 15 is given a prescribed axial and torsional resilience—e.g., it may be relieved as indicated in FIG. 6 at 15-CO (see also FIG. 2) to render it "softer", less stiff, and more resilient—particularly for accommodating axial and angular (torsion) misalignment—this being kept consistant with torsional strength, of course, as workers will understand.

Additionally, slots may be cut-out along the length of sleeve 13 as indicated as 13-SL to provide greater angular flexibility and so accommodate a prescribed shaft misalignment as workers will understand. (Likewise for sleeve 23). Further, the inner proximate portion of the center bore 13-CB of sleeve 13 may be tapered as required to enhance the misalignment-accommodating capabilities of the device—i.e., to shaft-sleeve contact under extreme misalignment (also an assembly convenience).

Operation; FIG. 7

The operation of the above-described embodiment will generally be understood by workers, but will become clearer upon consideration of FIGS. 4 and 7, treated below.

Referring to FIG. 7, three somewhat simplified sectional, end views will be seen; these showing, in cross-section, knob 21 engaged drivingly within cup 11 in a sequence of three successive typical modes:—"Driving" (FIG. 7A); "Override" (FIG. 7B) and "Slipping" (FIG. 7C).

Here, knob 2 will be assumed as frictionally, drivingly fitted into cup 11 sufficient (penetration) to bring the coupling into the desired operational mode, with the drive shaft coupled to drive the driven shaft. That is, the hhead 21 of knob 2 is fitted drivingly engaged within inner cup walls 11-W, with lobes L engaged with respective flats in FIG. 7A. Workers will appreciate that the drive lobes (e.g., lobe L-1) are here engaged on one side of an associated flat 11-F, while cup 11 (its associated driving shaft) is being torsionally urged, under a prescribed "over-torque" $F_t$, in the indicated direction.

This over-torque will be understood as sufficient to cause a deforming flexure of the cup walls supporting any given lobe (e.g., of wall section 21-wl supporting lobe L-1, deforming cup 11 and stretching the inter-flat segments, flattening them somewhat) as the lobes are forced, "scrapingly", across a drive-flat, as indicated in FIG. 7B.

Finally, the lobes, will be understood as completing their excursion across the flats, to be thereafter "released" (the supporting wall portions thereof resiliently returning to normal, undeformed condition) to "slip" to the next drive position (e.g., L-1 slipping rotationally sufficient to engage the succeeding flat 11-F' in FIG. 7C). Thus, the desired torque-limited coupling is effected according to the invention.

More particularly, when the indicated torque is applied to either drive shaft (either to that coupled to the knob or that coupled to the cup), and rotates them to a prescribed degree relative to one another, the "driving" member will revolve until the drive lobes L on knob 2 are engaged with the cam-drive flats on cup 11. This will interlock the coupling members, so as to revolve both members in a "driving, coupled mode" (FIG. 7A). And, if the resistive torque from the driven side is proper, (i.e., not "over-torqued") the unit will continue to revolve normally.

However, if this resistive torque increases beyond the prescribed transmissible level of the coupling, (torque-limitation feature) then coupling M-C will assume "override mode", and begin to "slip" as desired (FIG. 7B) (e.g., this might be induced by a hand caught between the gates U-D, L-D of FIG. 1). When this occurs the flexure-walls under the drive lobes are depressed and deformed sufficient to allow each lobe to pass compliantly across its engaged cam flat and be disconnected therefrom frictionally—the lobe continuing to rotate until engaging the next successive drive flat (whereupon a new torque-limiting sequence begins). This sequence will continue until the resistive torque falls below the transmittable torque level ($T_t$) of the coupling—a level which may be designed-in and tailored to suit the convenience of the user, according to a feature of this invention—and something that will be much appreciated by those skilled in the art.

Coupling "fit"; FIG. 4; Advantages

Figure 4:
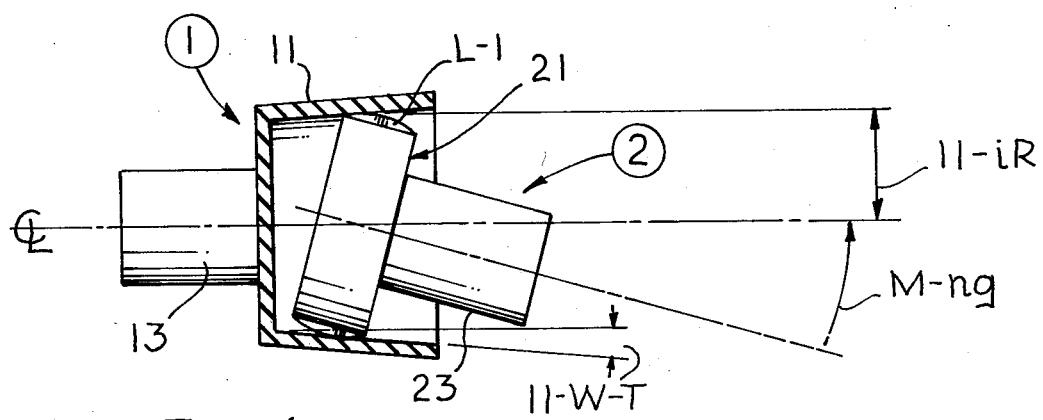

FIG. 4 may be considered for a better appreciation of how members 1, 2 inter-fit, and how the spherical lobe arrangement on knob 2 can accommodate angular and axial shaft misalignment as well as "override" torque. The spherical outer-diameter (L-OD) of lobes L must be the same as the mean internal diameter $ID_m$ of cup 11. [i.e., L-OD=$ID_m$]. This relation should minimize changes in torque output as angular misalignment increases—something of advantage as workers in the art will greatly appreciate.

This advantage is better understood by considering a prescribed exemplary angular misalignment (M-ng) between knob 2 and cup 11. Here, it will be assumed that the inner cup walls 11-W have a prescribed internal radius 11-IR and a prescribed taper 11-W-T, as specified above. Workers will appreciate that angular deviations as great as 10 degrees and axial misalignment as much as 40 mils have been achieved with such embodiments—something surprising in the art.

Also, the drive taper 11-W-T can be formed to suit each particular requirement: a convenience feature workers will appreciate. For example, if a mechanism is required to be driven over a particular torque range, a drive taper can be provided to give the minimum torque at minimum knob insertion extent and a maximum torque at maximum insertion. Thus, advantageously, no "setting" of the assembly is required for varying levels of torque—the coupling will always deliver the applied torque as long as it falls between the Maximum and Minimum levels specified and designed-in. And, minimum knob-penetration can be controlled to yield minimum torque transmission, with this increasing as penetration increases (with tapered cup)—up to the prescribed maximum (penetration/torque output)—after which "slip" occurs. Such a non-critical penetration factor is seen as quite new and useful for such couplings.

Workers will perceive that such features provide "design freedom" and "user versatility"—whereby one is able to mount the driving and driven shafts to very "open tolerances", yet still ensure that drive torque specifications will be achieved and not exceeded. Workers will be surprised at the simplicity of such couplings and their associated low cost and ease of manufacture (e.g., design easily modified by slight change in molds yet producing a marked change in performance—such as lobe-enlargement, increase in number, etc; change in wall-relief giving stiffness change). The consistent torque slip output (no bedding in period needed) will also be appreciated.

Manufacture of Embodiment

Workers will appreciate that the above indicated embodiment can be manufactured simply, conveniently, and economically, using "state-of-art" techniques. Preferably, the coupling is manufactured by known, economical injection molding techniques. Workers will appreciate that misalignment couplings having a variable-torque accommodation are not characteristically produced in such an economical fashion, nor using such simple, known parts and materials. Of course, as mentioned, one will change frictional and resilience characteristics—simply by modifying the material and/or slotting of the molded part—to meet any particular specification. The size, number, location, etc., of projecting parts and slots (relieving) can be molded quite conveniently and easily modified—according to simple techniques—a feature of great convenience and versatility. Thus, interchangable mold "inserts" may be provided, as workers can see, to enable variations of the coupling to be produced which meet a wide array of torque and mounting requirements—these requiring only a quick, simple insertion into, or removal of, parts into the molds.

Other variants

It will be understood that the preferred embodiments described herein are only exemplary, and that the invention is capable of many modifications and variations in construction, arrangement and use without departing from the spirit of the invention.

For instance: one member may be made rigid, with the other resilient; lobes might be placed on the cup and flats on the knob; the lobes (which give mostly "point contact" in the illustrated embodiment) could be fashioned as a knob, or fashioned more as a "blade", or otherwise to give "line contact" and resist pivoting (where no substantial misalignment is contemplated; e.g., in an in-line shaft array); or the lobes could be made more flexible (e.g., for smooth "clutch-slip") and/or their mount more stiff; the lobe-flat array could be arranged to provide "only unidirectional slip", with positive drive for "REVERSE" and/or to provide "soft start" characteristics (reducing "starting-shock" and overall power consumption)—also the lobe/flat "slip coupling" could be eliminated in a modified "non-slip" flexible coupling.

Further modifications of the invention are also possible. For example, the means and methods disclosed herein are also applicable to other shaft systems and the like. Also, the present invention is applicable for different coupling requirements where only some (and not all) of the indicated operating features are desired.

The above examples of possible variations of the present invention are merely illustrative. Accordingly, the present invention is to be considered as including all possible modifications and variations coming within the scope of the invention as defined by the appended claims.

What is claimed is:

1. An improved inter-shaft clutch coupling comprising a pair of male and female members, at least one of which is resilient, each constructed and adapted to be attached to an associated rotatable shaft and to interfit so as to couple one shaft to be driven by the other, while also including respective frictional interfit means and, further, accommodating relative axial and/or angular misalignment therebetween.

2. The combination as recited in claim 1, wherein one member is configured as a resilient cup, the other configured as a resilient knob, the inner walls of said cup and the periphery of said knob including frictional engagement means adapted to be selectively interfit so as to effect the said coupling function; one of said engagement means comprising an array of protuberances formed on the surface of one member to be integral therewith; the other engagement means comprising an array of associated engagement surfaces formed on the other member and adapted to frictionally engage said protuberances.

3. The combination as recited in claim 2, wherein said coupling comprises a "misalignment/override slip-coupling" adapted to accommodate and transmit a prescribed range of torque between said shafts; one member comprising a lobed knob; the other comprising a cup means having frictional flats disposed about the inner walls thereof, said inner walls being tapered axially and inward of the cup so as to accommodate a range of transmitted torque according to the degree of penetration of said lobed knob.

4. An improved inter-shaft clutch coupling comprising a pair of resilient male and female members, each constructed and adapted to be attached to an associated rotatable shaft and to interfit so as to couple one shaft to be driven by the other, while also including respective frictional interfit means and, further, accommodating relative axial and/or angular misalignment therebetween;

one such member comprising a cup means having resilient conic walls including inner friction-sectors, and projected upon a shaft-receiving resilient boss;

the other member comprising a resilient-walled head means including peripheral friction members and mounted upon a resilient shaft-receiving boss, said head including frictional means about the periphery thereof adapted to be received by said friction-sectors in torque-limiting frictional enngagement.

5. The combination as recited in claim 4, wherein said cup means and said head means each comprise a unitary molded plastic part of prescribed resilience.

6. The combination as recited in claim 5, wherein each said boss comprises a resilient plastic sleeve including a deformable flexure segment, the resilience thereof being adjusted according to relief apertures in the supporting walls thereof.

7. The combination as recited in claim 6, wherein said cup means and said head means each include relative resilient peripheral walls, the stiffness of which is adjusted according to a prescribed pattern of relieving apertures disposed and molded therein.

8. The combination as recited in claim 7, wherein said cup and head means are each tailored in flexibility to accommodate a prescribed torque-slip and a prescribed degree of shaft-skew, the walls of said cup means being thus adapted to stretch and accommodate prescribed over-torque and rotational slip of said head means when the torque limit has been exceeded.

9. The combination as recited in claim 8, wherein said head means is designed and fabricated for a prescribed maximum torque according to the number and type of lobes distributed about the periphery thereof.

10. The combination as recited in claim 9, wherein said cup means is designed and fabricated so as to accommodate a prescribed maximum torque according to the number and type of lobe-receiving flats disposed therein and according to the resilience of the flat-supporting walls of the cup means.

11. The combination as recited in claim 10, wherein the inner walls of said cup means are tapered inwardly to accommodate a prescribed range of transmitted torque without need for operational adjustments but merely according to the degree of head penetration therein.

12. The combination as recited in claim 11, wherein said coupling is disposed in the drive chain of a security closure apparatus, one of said members being coupled to a driving shaft which is, in turn, coupled to a selectively driven motive means; the other member being coupled to a drivven shaft which is, in turn, coupled, through associated linkage, with a pair of vandal gates mounted on the linkage and adapted to be translated thereby between an "open" and a "closed" condition.

13. The combination as recited in claim 1, wherein the female member includes a cavity having inner walls with friction-sectors; and the male member comprises a truncated sphere projected from a resilient shaft-receiving tube, this sphere having an array of identical frictional blades disposed uniformly and symmetrically about the periphery of the sphere and adapted for selective frictional engagement with said friction-sectors of the cavity walls of said female member.

14. An improved inter-shaft slip coupling comprising a pair of resilient male and female members, each constructed and adapted to be attached to an associated rotatable shaft and to interfit so as to couple one shaft to be driven by the other, while also including respective frictional interfit means and, further, adapted to flexibly accommodate relative axial and/or angular misalignment therebetween; said female member comprising a resilient concave shell projected from a resilient shaft receiving boss, this shell including blade-engaging frictional zones distributed about the inner walls thereof; said male member comprising a truncated sphere projected from a resilient shaft-receiving tube, this sphere having an array of identical frictional blades disposed uniformly and symmetrically about the periphery of the sphere and adapted for selective frictional engagement with said frictional zones on the walls of said female member.

15. The combination as recited in claim 14, wherein each said boss comprises a resilient tubular segment adapted to accommodate a prescribed amount of skew and misalignment between the shafts coupled by said members.

* * * * *

UNITED STATES PATENT AND TRADEMARK OFFICE
CERTIFICATE OF CORRECTION

PATENT NO. : 4,180,990
DATED : January 1, 1980
INVENTOR(S) : Terence A. Hill

It is certified that error appears in the above—identified patent and that said Letters Patent are hereby corrected as shown below:

Col. 2, line 5, change "rathher" to --rather--.

Col. 5, line 35, change "3-dg," to --(S-dn),--;

line 37, change "S-gg," to --S-dg,--.

Signed and Sealed this

First Day of April 1980

[SEAL]

Attest:

SIDNEY A. DIAMOND

Attesting Officer      Commissioner of Patents and Trademarks